P. HOLMGREN.
CAR WHEEL.
APPLICATION FILED MAR. 29, 1910.
977,308.
Patented Nov. 29, 1910.
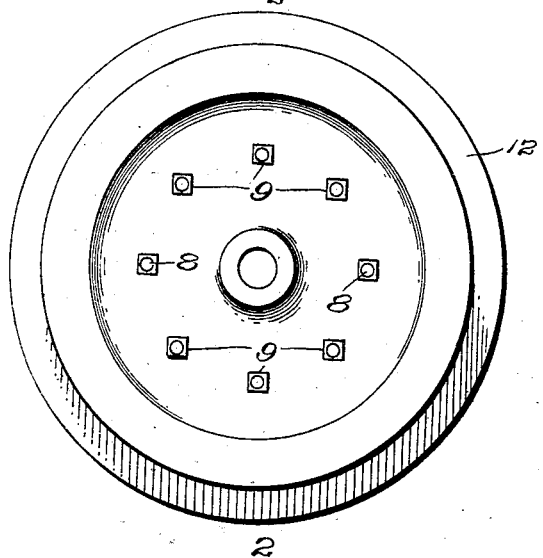
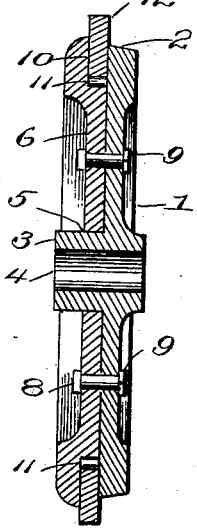
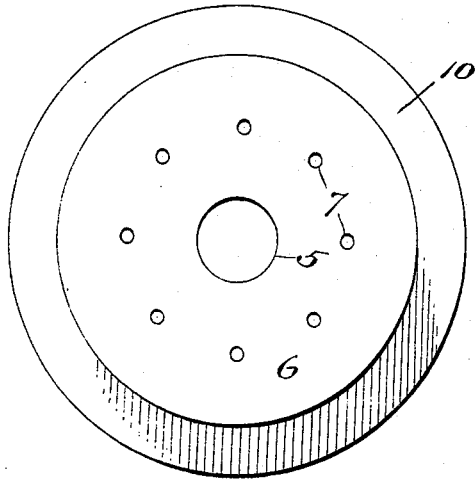
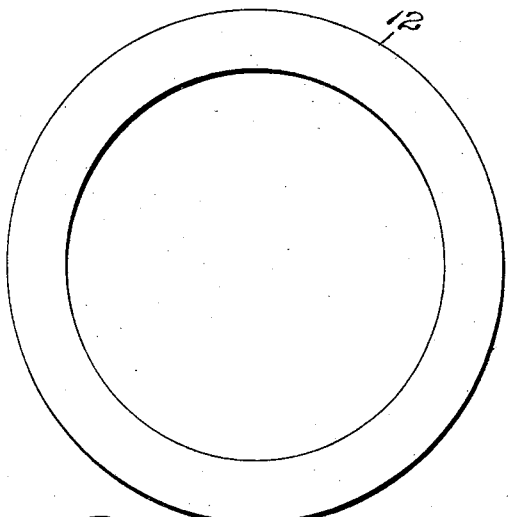
Witnesses
Peter Holmgren Inventor
By Attorney

UNITED STATES PATENT OFFICE.

PETER HOLMGREN, OF MAMMOTH, UTAH, ASSIGNOR OF ONE-FOURTH TO EDWARD PIKE, OF MAMMOTH, UTAH.

CAR-WHEEL.

977,308.  Specification of Letters Patent.  Patented Nov. 29, 1910.

Application filed March 29, 1910. Serial No. 552,138.

*To all whom it may concern:*

Be it known that I, PETER HOLMGREN, residing at Mammoth, in the county of Juab and State of Utah, have invented certain new and useful Improvements in Car-Wheels, of which the following is a specification.

My invention relates to improvements in car wheels, and the object of my invention is the provision of a car wheel formed of a series of sections, whereby when one section shall have become worn out or broken it can be readily replaced without involving the outlay of money rendered necessary where a complete new wheel must be provided when the flange, tread or bearing portion of the wheel is damaged.

A further object of the invention is the provision of an improved economical wheel of this type in which the flange can be quickly and easily replaced when broken without the necessity of removing the wheel or of taking the weight or pressure of the car off of said wheel.

Another object of the invention is the provision of a wheel having a flange capable of independent movement, the movement of said flange serving to push obstacles along in front of the wheel instead of compelling the wheel to ride over the same when they are obstructing the track, thus preventing many of the disastrous accidents occasioned by small obstructions on the track lifting the wheels and by lifting the flanges out of engagement with the rails allowing the wheels to shift therefrom and thus derailing the train.

To attain the desired objects, my invention comprises a car wheel composed of a main tread wheel section, a separable flange capable of independent movement with respect thereto, and a clamping and retaining section, my invention further consisting in the novel combination and arrangement of said parts for service substantially as hereinafter described and as illustrated in the accompanying drawings.

Figure 1 represents a side elevation of a car wheel constructed in accordance with and embodying the principles of my invention, a portion of the wheel being broken away to show the interior construction of the device and the inner rim of the flange being indicated by the dotted line. Fig. 2 represents a sectional view of the device taken on line 2—2 of Fig. 1. Fig. 3 represents a side elevation of the clamping disk, and, Fig. 4 represents a similar view of the removable flange.

In the drawings, the numeral 1 designates the main portion of the wheel having the tread surface 2 and the central sleeve 3 having the aperture 4 adapted to receive and form a bearing for the customary axle. Mounted on the sleeve 3 and having an aperture 5 receiving the same is the clamping disk 6, said disk and the wheel both having a corresponding series of radially disposed openings 7 formed therein to receive the clamping bolts 8, said bolts having nuts 9 engaged on their ends to lock the plate and wheel together. Formed in the inner surface of the disk 6 is the annular groove 10 extending to the outer edge of the disk, and mounted in the groove and bearing against the base thereof is an annular row of rollers 11, the ends of said rollers engaging the disk and wheel, while mounted in the groove and having its inner edge bearing against said rollers is the ring-flange 12, said ring projecting outward beyond the wheel and disk to retain the wheel in position upon the track.

From the foregoing the construction of my wheel and the combination and arrangement of parts thereof will be fully understood, and it will be seen that I provide a wheel composed of strong, simple and durable parts which can be readily assembled and permits of any desired part being removed and replaced by a new part, thus greatly prolonging the life of the wheel and involving a great saving in replacing the damaged part instead of being compelled to provide an entire new wheel as is now the case.

It will be further observed that I have provided a wheel having a separable flange which is capable of independent movement, said flange being supported by anti-friction rollers to reduce to a minimum the friction between the flange and the wheel proper when they are moving in opposite directions, and the all-important advantage secured by providing a flange of this character is that when said flange strikes obstructions on the track it does not ride up onto the same, but the flange remains practically stationary and merely pushes against said obstacle instead of rolling thereon as would an integrally formed flange while the portion 1 of the wheel revolves on the track, the flange thus serving to push the obstacle along in front of the wheel and off the track instead of riding on said obstacle and thus lifting the wheel and derailing the same.

I claim:

1. The combination with a car wheel, of a ring-flange carried thereby and capable of independent rotation with respect thereto, and laterally disposed anti-friction rollers interposed between the wheel and the inner edge of the ring for facilitating said rotative movement.

2. In a car wheel, the combination with a main section having a central opening in which the axle is journaled, of a tread surface formed on the outer periphery of the main section, said section having an annular groove at one side of the tread surface, a peripheral band of anti-friction rollers carried by the groove, and a ring bearing against said rollers and projecting from the tread to form a guiding flange capable of independent movement with respect to the tread.

3. In a car wheel, the combination with a main section having an elongated sleeve forming a journal for the car axle, of a disk mounted on said sleeve and extending outward beyond the main section, bolts securing the two sections together, and a ring member mounted in a groove formed in the periphery of the disk and projecting from the periphery of the wheel to provide a guiding flange adapted to rotate in the opposite direction to that in which the wheel rotates.

In testimony whereof I have affixed my signature in presence of two witnesses.

PETER HOLMGREN.

Witnesses:
  EDWARD PIKE,
  C. E. HUISH.